May 24, 1927.  
E. MORSE  
LOCK NUT  
Filed Jan. 8 1926
1,629,726
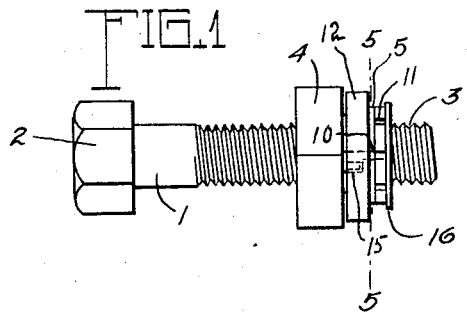
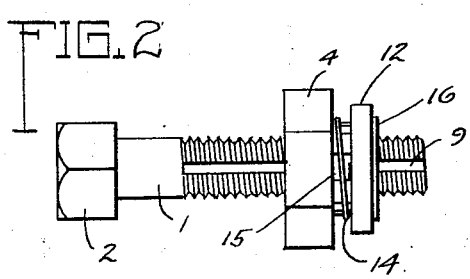
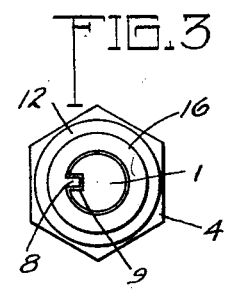
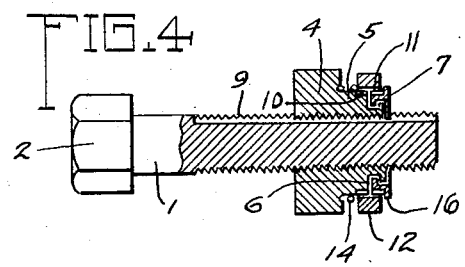
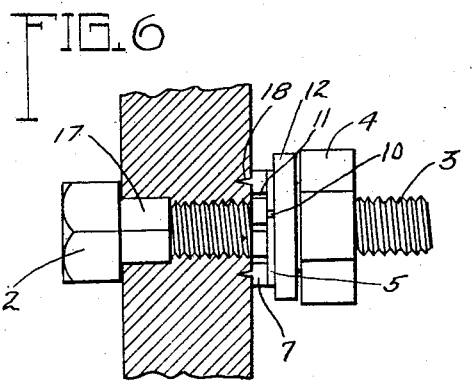
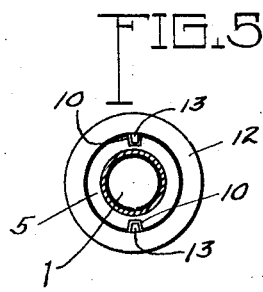
INVENTOR.  
Edgar Morse.  
BY Walter N. Haskell,  
his ATTORNEY.

Patented May 24, 1927.

1,629,726

UNITED STATES PATENT OFFICE.

EDGAR MORSE, OF ROCK ISLAND, ILLINOIS.

LOCK NUT.

Application filed January 8, 1926. Serial No. 79,940.

My invention has reference to a nut-lock, and the character thereof is similar to that of a nut and bolt lock for which I have filed an application for Letters Patent of the United States under date of Mar. 2, 1925, Serial No. 12,689. The purpose of the present invention is to increase the efficiency of the device mentioned, to unite certain parts of the device by a lock member, as in the former case, and to have said lock member self-seating. All of the parts of the invention are also assembled in such a way that no one part can be detached from the others, so as to be misplaced.

In the general use to which the invention is to be put it is necessary to have the same engaged in a way with the bolt, and this arrangement is shown in most of the figures of the drawings. By a reversal of the position of the nut, however, this engagement may be omitted, and this method is also shown in the drawings, and will be hereinafter more fully set forth.

The above-named, and other features and advantages of the invention will be more fully understood from the following specification, taken in connection with the accompanying drawings, in which:

Fig. 1 is a side view of the invention, in position when in use, with the nut free to move on the bolt.

Fig. 2 is a similar view, with the nut locked from movement.

Fig. 3 is an end view thereof.

Fig. 4 is a longitudinal section of the invention, with the ring 12 in the position shown in Fig. 2.

Fig. 5 is a cross-section on the broken line 5—5 of Fig. 1.

Fig. 6 shows the invention with the nut in reversed position.

The reference number 1 indicates a bolt of usual construction, provided with a head 2, at one end and a threaded portion 3 at the other end. 4 is a nut, provided with a reduced circular extension 5, both the nut and extension being interiorly threaded to correspond with the thread 3. At its outer end the extension 5 is fitted with an annular channel 6, to receive a flange or other retainer on the inner edge of a collar 7, whereby said collar is rotatable independently of the nut. At its inner edge said collar is also provided with a lug 8, movable in a channel 9 formed in one of the sides of the bolt 1, in its threaded portion. By this means rotation of the collar independently of the bolt is prohibited.

In the outer end of the extension 5 is a pair of notches 10, adapted to register with similar notches 11 in the outer edge of the collar 7, in which collar any desired number of said notches may be formed. Encircling the part 5, so as to have movement thereon, is a ring 12, provided on its inner face with a pair of fins 13, capable of entering the notches 10 and 11. Between the ring 12 and nut 4 is a coiled spring 14, the force of which tends to move the ring outwardly, to cause an engagement of the fins 13 with coinciding notches in the extension 5 and collar 7. The ring 12 may be held normally out of engagement with the notches by means of recesses 15 in the extension 5, forming extensions of the notches 10, and by forcing the ring against the nut 4 and rotating the same slightly the fins 13 are engaged with the shoulders of the recesses, holding the same from outward movement. When it is desired to lock the nut and collar 7 together the ring 12 is turned in a direction to release the fins 13, which at once enter the notches 10, and if such notches are not in line with the notches 11 a slight movement of the collar will bring them into register, whereupon the fins will enter the notches 11 also, preventing rotation of the nut 4 independently of the collar 7, or of the bolt. The outward movement of the ring 12 is limited by a flange 16 on the edge of the collar 7.

The inner diameter of the collar 7 is greater than that of the threaded end of the bolt, so that when the nut is being turned into position on the bolt the collar will slip readily over the threads. When the nut 4 is brought into contact with the object through which the bolt passes the ring 12 is actuated to lock the parts together, and even if the bolt turns in its seat it is impossible for the nut to become detached therefrom. If it is desired to release the nut, the ring is slipped back thereon, and the fins 13 engaged in the recesses 15, whereupon the nut can be turned again, in a direction to cause the same to travel toward the end of the bolt.

It will be observed that the use of two of the fins 13 and corresponding recesses 10 is a matter of choice, and that the same result can be secured by the use of one each thereof. The use of two of said fins serves to balance the ring a little more perfectly in its movements.

In Fig. 6 the nut is shown in reversed position on the bolt, this arrangement being adapted more especially for use when the bolt is seated in a piece of wood or other relatively soft material, as shown at 19. For this use the collar 7 is enlarged a little, and provided with prongs or other engaging members, which are forced into the wood when the nut is seated, and prevent rotation of the collar. After the collar is thus positioned the ring 12 is operated to lock the nut and collar together, in the manner above described, and all of the parts of the nut are locked from movement. In this application of the invention the bolt is shown provided with a square shoulder at 17, which prevents the bolt from turning in its seat, and in this arrangement the slot 9 in the bolt and lug 8 on the collar may be omitted.

What I claim, and desire to secure by Letters Patent, is:

1. A device of the class described, comprising a nut, provided with a circular extension having locking elements, a collar held rotatably on the end of said extension, and provided with locking elements adapted to register with said first-named locking elements, a locking ring mounted on said extension, adapted for engagement with the locking elements on said extension and collar, to hold one of said parts from rotation independently of the other, and a retainer carried by said collar, to prevent the release of said ring.

2. In a device of the class described, a bolt, provided with a longitudinal channel, a nut provided with a circular extension threaded to operate on said bolt, the extension having locking elements on its outer face, a collar held on the end of said extension, so as to be rotatable thereon, having a lug movable in said channel, and provided with locking elements capable of being brought into register with said first-named locking elements, a locking ring slidable on said extension and collar, and engageable with the locking elements on said extension and collar, and a retainer on said collar limiting the outward movement of said locking ring.

3. In a device of the class described, a bolt provided with a longitudinal channel, a nut provided with a circular extension threaded to operate on said bolt, said extension having locking elements on its outer face, a collar held rotatably on the end of said extension, having a lug movable in said channel, and provided with locking elements capable of being brought into register with said first-named locking elements, a locking ring slidable on said extension and collar, means for forcing said ring into engagement with said locking elements, and means for limiting the outward movement of said ring.

4. In a device of the class described, a bolt provided with a longitudinal channel, a nut threaded to operate on said bolt and provided with a circular extension, having locking elements on its periphery, a collar held rotataby on the end of said extension having a lug on its inner face slidable in said longitudinal channel, provided with locking elements adapted to coincide with those on said extension, a spring-actuated ring slidable on said extension and collar, and engageable with the locking elements thereon, means for holding said ring out of engagement, and means on said collar for limiting the outward movement of said ring.

In testimony whereof I affix my signature.

EDGAR MORSE.